(12) United States Patent
Nakamura et al.

(10) Patent No.: US 7,900,975 B2
(45) Date of Patent: Mar. 8, 2011

(54) THREADED JOINT FOR STEEL PIPES

(75) Inventors: Keiichi Nakamura, Wakayama (JP); Takahiro Hamamoto, Wakayama (JP); Masaaki Sugino, Nishinomiya (JP); Suguru Yamaguchi, Amagasaki (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 12/571,642

(22) Filed: Oct. 1, 2009

(65) Prior Publication Data
US 2010/0078936 A1 Apr. 1, 2010

Related U.S. Application Data

(63) Continuation of application No. PCT/JP2008/056964, filed on Apr. 2, 2008.

(30) Foreign Application Priority Data

Apr. 2, 2007 (JP) ................................. 2007-096624

(51) Int. Cl.
*F16L 35/00* (2006.01)
(52) U.S. Cl. ........................................................ 285/334
(58) Field of Classification Search .................. 285/334, 285/333
See application file for complete search history.

(56) References Cited

U.S. PATENT DOCUMENTS

| 4,398,756 | A | | 8/1983 | Duret et al. |
| 4,549,754 | A | * | 10/1985 | Saunders et al. ............... 285/334 |
| 5,782,503 | A | * | 7/1998 | Noel et al. ..................... 285/334 |
| 6,322,110 | B1 | | 11/2001 | Banker et al. |
| 6,848,724 | B2 | * | 2/2005 | Kessler ......................... 285/334 |
| 7,331,614 | B2 | * | 2/2008 | Noel et al. ..................... 285/334 |
| 7,416,374 | B2 | * | 8/2008 | Breihan et al. ................ 285/334 |

FOREIGN PATENT DOCUMENTS

| JP | 60-157583 | 8/1985 |
| JP | 2001-165363 | 6/2001 |
| JP | 2002-61780 | 2/2002 |
| WO | 92/15815 | 9/1992 |
| WO | 2004/109173 | 12/2004 |

* cited by examiner

*Primary Examiner* — David E Bochna
(74) *Attorney, Agent, or Firm* — Clark & Brody

(57) ABSTRACT

A threaded joint for steel pipes constituted by a pin having male threads and a box having female threads is improved with respect to ease of insertion of the pin and galling resistance of the threaded portions. The stabbing flanks of the threads in a complete thread portion of one of the pin and a box has a two-step stabbing shape having a chamfer. The two-step stabbing shape has a stabbing flank angle α of 5-45° and a chamfer angle β of 20-60°. The ratio h/H of the chamfer height h to the thread height H of the pin is 0.25-0.50, or the ratio of the cross-sectional area of the chamfered portion to the overall cross-sectional area of the stabbing flank is made at least a value corresponding to a chamfer height ratio h/H of 0.25 and at most a value corresponding to a chamfer height ratio of 0.50.

18 Claims, 3 Drawing Sheets

$h$; Stabbing chamfer height
$H$; Thread height

THREADED JOINT FOR STEEL PIPES

This application is a continuation of International Patent Application No. PCT/JP2008/056964 filed Apr. 2, 2008.

TECHNICAL FIELD

This invention relates to a threaded joint for use in connecting steel pipes such as oil country tubular goods (OCTG), which include tubing and casing used for the exploration of oil wells and gas wells and production of crude oil and natural gas, riser pipes, line pipes, and the like. In particular, it relates to a threaded joint for steel pipes which enables a pin to be easily inserted in a sloping state and which has excellent galling resistance in their threaded portions.

BACKGROUND ART

A threaded joint for steel pipes is constituted by a pin, which is a component which has male threads (external threads) and which is provided on the end portion of a first tubular member, and a box, which is a component which has female threads (internal threads) and which is provided on the end portion of a second tubular member. Connection of the joint is carried out by threaded engagement of the male threads and the female threads, both of which are typically the tapered threads. Typically, the first tubular member is a pipe such as an oil country tubular good, and the second tubular member is a separate member in the form of a coupling. (This type of threaded joint for steel pipes is referred to as a coupling type). In this arrangement, a pin is formed on both ends of a pipe, and a box is formed on both sides of a coupling.

Another type of threaded joint for steel pipes is the integral type which does not use a coupling and which has a pin formed on the outer surface on one end of a pipe and a box formed on the inner surface of the other end of the pipe. In this type of a threaded joint, the first tubular member is a first pipe, and the second tubular member is a second pipe.

In the past, oil country tubular goods were connected primarily using standard threaded joints prescribed by API (American Petroleum Institute) standards. However, in recent years, as the environments for excavation and production of crude oil and natural gas are becoming severe, special high performance threaded joints referred to as premium joints are increasingly being used.

In a premium joint, each of the pin and the box has, in addition to tapered threads which enables the joint to be tightened, a seal surface provided on its peripheral surface in the vicinity of the threads and a shoulder surface which serves as an abutting stopper during makeup of the joint. The joint is designed to allow radial interference between the seal surfaces of the pin and the box. If the joint is tightened until the shoulder surfaces of the pin and the box abut each other, the seal surfaces of these members intimately contact each other around the entire periphery of the joint and form a seal by direct metal-to-metal contact. The shoulder surfaces not only act as abutting stoppers at the time of makeup but also act to bear a compressive load acting on the joint.

FIG. 1 is a schematic explanatory view of a coupling type threaded joint for steel pipes of the typical premium joint type. (A) is an overall view, and (B) is an enlarged view of a portion thereof. As shown in FIG. 1(B), the threaded joint for steel pipes has a pin 1 which is a component with male threads provided on the end of a pipe and a box 2 which is a corresponding component with female threads provided on both sides of a coupling. On its outer surface, the pin 1 has tapered male threads 11 and an unthreaded cylindrical abutting portion called a lip (referred to below as a lip portion) 12 provided on its tip adjoining the male threads 11. The lip portion 12 has a seal surface 13 on its outer peripheral surface and a (torque) shoulder surface 14 on its end surface.

The opposing box 2 has tapered female threads 21, a seal surface 23, and a shoulder surface 24 which can engage with or abut the tapered male threads 11, the metal seal surface 13, and the shoulder surface 14, respectively, of the pin 1. Some of the female threads at the tip of the box (in the illustrated example, four threads) are non-engaging threads which do not completely engage with a thread of the pin. In this case, some of the corresponding male threads at the inner end of the pin are incomplete threads which do not have the desired male thread shape required for complete engaging with a female thread. The presence of incomplete threads in this location in either a pin or box or both is necessary for smooth insertion of the pins at the time of makeup of a joint. In some joints, the male threads on the tip side close to the seal surface of the pin are incomplete threads which do not engage with the female threads of the box.

As shown in the figure, a lip portion which has a shoulder surface as an end surface is typically provided on the tip of the pin, but it is also possible to provide a lip portion on the tip of the box or to provide it on the tips of both the pin and the box.

FIG. 2 is a schematic view for explaining the shape and dimensions of a trapezoidal thread of which an API buttress thread is typical. As in FIG. 1, 11 is a male thread and 21 is a female thread. Threads used in premium joints are mostly trapezoidal threads emulating this API buttress thread. With many threads, the aspect ratio of the threads (ratio of height to width), the flank angles (the angles of slope of the side surfaces or flanks), and the like almost exactly copy the dimensions of an API buttress thread.

In FIG. 2, in the case of API buttress threads having a thread pitch of 5 TPI (5 threads per inch), the thread height 74, which is the height of the crest of the male threads, is 1.575 mm, the flank angle 71 (loading flank angle) of the loading flanks (which are the side surfaces of threads on the rear side in the direction of insertion of a pin) is 3°, the flank angle 72 (stabbing flank angle) of the stabbing flanks (which are the side surfaces of threads on the front side in the direction of insertion of a pin) is 10°, and the average value of the separation 73 in the axial direction of the joint 73 between the stabbing flanks of the male threads and the female threads (the stabbing flank gap) is approximately 100 μm (30-180 μm).

When vertical wells were predominant, a threaded joint for steel pipes could adequately function if it could withstand the tensile load due to the weight of pipes connected to it and prevent leaks of high pressure fluids passing through its interior. However, in recent years, in light of the fact that wells are becoming deeper and sloping wells or horizontal wells having a well bore which is curved underground are increasing and the development of wells in worse environments such as in the oceans or polar regions is increasing, threaded joints are demanded to have a wide variety of properties including resistance to compression, bending resistance, sealing performance against external pressure, and ease of use in the field.

Concerning the thread shape of a threaded joint for steel pipes, below-listed Patent Document 1 describes a threaded joint for steel pipes in which the threads of both a pin and a box, i.e., both the male threads and female threads are given a two-step stabbing shape having a chamfer made by removing a region between the crest of a thread and the stabbing flank along a straight line or a curve. The chamfered portion functions as a contact surface which is the first region to undergo contact when the pin is inserted into the box. The purpose of this contact surface is to facilitate insertion by contact of the contact surfaces of the pin and the box if the pin and the box are misaligned in the axial direction when the pin is being inserted into the box.

Below-listed Patent Document 2 describes a similar pipe joint. Namely, a corner chamfer is provided on the stabbing flanks of the threads of both a pin and a box. When the pin is inserted into the box, the corner chamfers engage with each other and facilitate insertion of the pin.

Both of Patent Documents 1 and 2 prevent misalignment of the insertion angle and facilitate insertion by producing contact between a pin and a box in chamfered portions between the stabbing flanks and the crests. Accordingly, chamfers are necessary on both the pin and the box, and the intended effect is not exhibited if chamfers are provided on only one of the two members.

In below-listed Patent Document 3, a threaded joint for steel pipes named "cylindro-conical pipe joint" is disclosed. It has complete threads in a cylindrical threaded zone and incomplete threads in a frust-conical threaded zone. For the box, a two-step stabbing shape in which a 45° bevel having a height of approximately one-half of the thread height is formed in the stabbing flanks of only the incomplete threads, thereby facilitating insertion of the pin. However, such a large beveling (chamfering) is not carried out with respect to the complete threads where the male threads of the pin engage the female threads of the box. Furthermore, the threaded joint disclosed in this document is designed for parallel threads, not tapered threads.

In below-listed Patent Document 4, as shown in FIG. 3 attached hereto, a threaded joint for steel pipes having a nose portion 15 provided between a seal surface 13 and a shoulder surface 14 at the end of a pin 1 is proposed. The nose portion 15 of the pin 1 does not contact the opposing portion of the box 2. On the other hand, the seal surfaces 13 and 23 and the shoulder surfaces 14 and 24 of the pin and the box contact each other. By extending the lip portion of the pin and providing a non-contacting nose portion 15 beyond the seal surfaces, the wall thickness of the lip portion in a limited pipe wall thickness and accordingly the wall thickness of the shoulder surfaces and the seal surfaces can be increased, and the resistance to compression of a threaded joint for pipes and its ability to seal against external pressure can be markedly increased.

| Patent Document 1 | WO 92/15815 |
| Patent Document 2 | U.S. Pat. No. 6,322,110 |
| Patent Document 3 | U.S. Pat. No. 4,398,756 (FIG. 5) |
| Patent Document 4 | WO2004/109173 |

DISCLOSURE OF INVENTION

The present invention provides a threaded joint for steel pipes which enables a pin to be easily inserted into a box even when the pin is sloping, and with which galling does not readily take place on the stabbing flanks of the threads of the pin and the box at the time of makeup.

According to the present invention, the above-described object can be achieved by imparting a substantial chamfer which satisfies prescribed conditions to the stabbing flanks of engaging threads (complete threads) of either one of a pin and a box to achieve two-step stabbing flanks.

As proposed in above-described Patent Documents 1 and 2, if a chamfer is imparted to the stabbing flanks of the threads of both a pin and a box, although stabbing of the pin becomes easy, costs increase, and the stability of makeup of threads decreases. As a result, if compressive loads become high, a sufficient tightening force can no longer be obtained, leading to a decrease in resistance to compression. In contrast, in the present invention, because a chamfer is formed on the stabbing flanks of the threads of only one of the pin and the box, ease of stabbing of a pin can be achieved, and at the same time, adverse effects on the stability of thread makeup and resistance to compression due to forming the chamfer are minimized.

The present invention is a threaded joint for steel pipes comprising a pin which is a tubular member having male (or external) threads, and a box which is a tubular member having female (or internal) threads, wherein the male threads and the female threads are tapered threads having at least a complete thread portion and optionally an incomplete thread portion, the threads in at least the complete thread portion having a roughly trapezoidal thread shape having a crest, a loading flank, and a stabbing flank with threads being separated from each other by thread roots. The term roughly trapezoidal thread shape indicates that the thread shape is trapezoidal if the taper of the tapered threads is neglected.

In the threaded joint for steel pipes according to the present invention, at least part of the threads in the complete thread portion of either the box or the pin has a two-step stabbing shape having a stabbing flank with a chamfer.

The two-step stabbing shape has a stabbing flank angle α of 5-45° and a chamfer angle β of 20-60° and meets either the following condition (1) or (2):

(1) the ratio h/H of the height h of the chamfer of the two-step stabbing shape to the thread height H of the pin is 0.25-0.50 (namely, 0.25<h/H<0.50); or (2) the following Inequality (3) is satisfied.

$$h' = \frac{h - z \cdot (1 - \sin\beta)}{\cos\beta} - y \cdot \sin(\beta/2 - \alpha/2) \quad (1)$$

$$H' = \frac{H - h - x}{\cos\alpha} + x \cdot \sin\alpha - y \cdot \sin(\beta/2 - \alpha/2) \quad (2)$$

$$\frac{h'}{h' + H'}(h/H = 0.25) \leq \frac{h'}{h' + H'} \leq \frac{h'}{h' + H'}(h/H = 0.50) \quad (3)$$

In these formulas, α is the stabbing flank angle (degrees) of the two-step stabbing shape, β is the chamfer angle (degrees) of the two-step stabbing shape, H is the thread height (mm) of the pin thread, h is the chamfer height (mm) of the two-step stabbing shape, x is the radius of curvature (mm) of the stabbing flanks at the thread crests of the pin, y is the radius of curvature (mm) at the starting point of the chamfer of the two-step stabbing shape, and z is the radius of curvature (mm) of the two-step stabbing shape at its thread crest.

The starting point of the chamfer of a two-step stabbing shape means the border between the chamfered portion and the non-chamfered portion, i.e., the portion of a chamfer on the thread root side (see below-described FIGS. 4 and 5).

In the above formulas, h' which is given by Equation (1) defines the cross-sectional area of the chamfered portion of the stabbing flank of a thread having a two-step stabbing shape, and H' which is given by Equation (2) defines the cross-sectional area of the non-chamfered portion (namely, the portion of the stabbing flank closer to the thread root than the chamfered portion) of the stabbing flank of a thread having a two-step chamfered shape. Accordingly, h'/(h'+H') in Inequality (3) means the ratio of the cross-sectional area of the chamfered portion to the total cross-sectional area of the stabbing flank of a thread having a two-step stabbing shape (referred to below as the chamfer cross-sectional area ratio). Namely, Inequality (3) prescribes that the chamfer cross-sectional area ratio is between a value corresponding to a ratio h/H of 0.25 (or the value when the ratio h/H is 0.25) and a value corresponding to a ratio h/H of 0.50 (or the value when the ratio h/H is 0.50).

The two-step stabbing shape having a chamfer with a shape as defined above is afforded to the stabbing flanks of at least part of the threads in the complete thread portion of either the pin or box, i.e., only one tubular member, of a threaded joint for steel pipes (the member being hereinafter referred to as a first tubular member), and it is not afforded to the threads in the complete thread portion of the other tubular member (hereinafter referred to as a second tubular member). Preferably, the threads of the main part (e.g., at least 80% of the threads) in the complete thread portion of the first tubular member have the two-step stabbing shape. Most preferably, all the threads in the complete thread portion of the first tubular member have the two-step stabbing shape.

As is well known in the art, a complete thread portion means a portion in which the threads have the complete shape designed for the thread portion.

With respect to the two-step stabbing shape, preferably the stabbing flank angle α is 8-15° and the chamfer angle β is 20-40°. The ratio h/H of the chamfer height h to the thread height H of the pin is preferably 0.3-0.4. Similarly, the chamfer cross-sectional ratio preferably satisfies the following Inequality (3') (in the formula, the symbols have the same meanings as described above).

$$\frac{h'}{h' + H'}(h/H = 0.3) \le \frac{h'}{h' + H'} \le \frac{h'}{h' + H'}(h/H = 0.4) \quad (3')$$

A threaded joint for steel pipes according to the present invention is preferably applied to the above-described premium joint. Namely, in a preferred embodiment, the pin and the box both have threads as well as seal surfaces provided on the peripheral surfaces in the vicinity of the threads, and shoulder surfaces which are constituted by an end surface of one of the pin and the box and a surface of the other member which contacts the end surface. In such a threaded joint for steel pipes, the shoulder surfaces can bear a portion of a compressive load, so the joint can maintain high resistance to compression even when a two-step stabbing shape is employed by providing a chamfer on the stabbing flanks of the threads in the complete thread portion of one of the pin and the box according to the present invention.

Of the pin and the box, the contact surfaces of at least the member having threads with a two-step stabbing shape, i.e., the contact surfaces of at least the above-described first tubular member preferably have at least one layer of surface treatment coating selected from a plated coating, a phosphate coating, a solid lubricating coating, a semisolid lubricating coating, and a viscous liquid lubricating coating formed thereon. Here, the contact surfaces mean the surfaces of the pin and the box which contact each other at the time of makeup of a joint. In the case of a premium joint, the contact surfaces are the threads as well as the seal surfaces and the shoulder surfaces.

When the contact surfaces of both of the pin and the box have a surface treatment coating, the member which is given the above-described two-step stabbing shape may be either the pin or the box. As a result, damage to the surface treatment coating at the time of insertion of a pin can be suppressed, and good stabbing ability and good galling resistance of the threads can be obtained. In this case, if the chamfer angle β is made large, the area of the pin and the box which can undergo sliding contact increases. As a result, damage to the surface treatment coating is further decreased, and galling resistance of the threads is further increased.

When only one of the pin and the box has a surface treatment coating on its contact surfaces, the surface treatment coating is preferably formed on the member having threads with a two-step stabbing shape (i.e., the first tubular member). For example, when a surface treatment coating is not formed on the pin surface but formed only on the box surface, a chamfer is preferably imparted to the stabbing flank of the box thread to form a two-step stabbing shape. As a result, the point of contact between the pin threads and the box threads in the threaded portions at the time of insertion of the pin into the box gradually moves from the crests of the stabbing flanks of the box threads towards the roots. Therefore, damage to the surface treatment coating decreases and good galling resistance of the threads is maintained. If the stabbing flanks of the threads of neither the pin nor the box have a chamfer, at the time of insertion of the pin, only the vicinity of the border between the crests and the stabbing flanks of the box threads always contacts the threads of the pin which is being inserted, so the surface treatment coating in this portion is severely damaged, and the galling resistance of the threads markedly decreases. Such damage is prevented in the present invention.

A threaded joint for steel pipes according to the present invention minimizes the adverse effects on resistance to compression caused by imparting a chamfer to a stabbing flank of a thread, and it makes it easy to insert a pin into a box. As a result, a pin can be easily inserted even when the pin is sloping when being inserted or when there is a slight deviation in the insertion direction of the pin. In addition, when at least one of the pin and the box has a surface treatment coating in order to impart lubricating properties to the contact surfaces thereof, damage to the coating is suppressed. As a result, it is difficult for galling of the stabbing flank of the threads of the pin and the box to take place at the time of makeup, and the galling resistance of a threaded joint is improved.

LIST OF REFERENCE NUMERALS

1: pin, 2: box, 11: male thread, 12: lip portion, 13: seal surface of pin, 14: shoulder surface at the end of a pin, 15: nose portion, 21: female thread, 23: first seal surface of box, 24: shoulder surface of box, 32: circumferential groove of box, 71: loading flank angle, 72: stabbing flank angle, 73: stabbing gap, 74: height of pin thread

BEST MODE FOR CARRYING OUT THE INVENTION

Below, the present invention will be explained in greater detail while referring to the attached drawings.

In the following description, the term "threads" refers to threads in a complete thread portion unless otherwise indicated.

A threaded joint for steel pipes according to the present invention can be applied to either a coupling type or an integral type. In the case of a coupling type, typically a pin is formed on both ends of a pipe and a box is formed on both sides of a coupling, but the opposite combination is also possible.

The threaded joint for steel pipes is constituted by a pin having male or external threads and a box having female or internal threads. Both the male threads and the female threads are tapered threads having at least a complete thread portion and optionally an incomplete thread portion, and the threads in at least the complete thread portion have a roughly trapezoidal thread shape having a crest, a flank surface, and a stabbing flank with adjoining threads separated from each other by a thread root.

Figure 1:
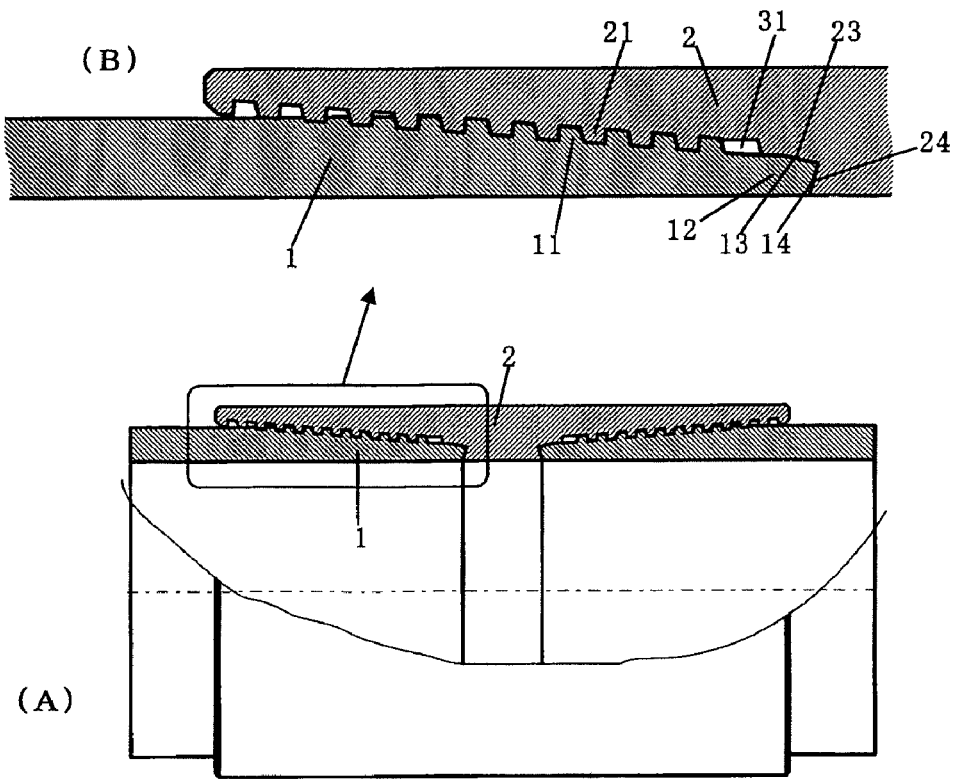
FIG. 1 is a schematic longitudinal cross-sectional view (A) and an enlarged view (B) in the vicinity of the tip of the pin of a typical conventional coupling-type threaded joint for steel pipes referred to as a premium joint.

The threaded joint for steel pipes is preferably a premium joint type in which, as shown in FIG. 1, the pin 1 and the box 2 each have threads 11 and 21 as well as seal surfaces 13 and 23 and shoulder surfaces 14 and 24. In the illustrated example, the end surface of the pin end is made a shoulder surface, and seal surfaces are formed on the peripheral surfaces of the pin and the box near the tip of the pin in the vicinity of the shoulder surfaces. However, instead of or in addition to this arrangement, a shoulder surface can be formed on the end of the box, and seal surfaces can be formed on the peripheral surfaces of the pin and the box in the vicinity of this shoulder surface.

Figure 3:
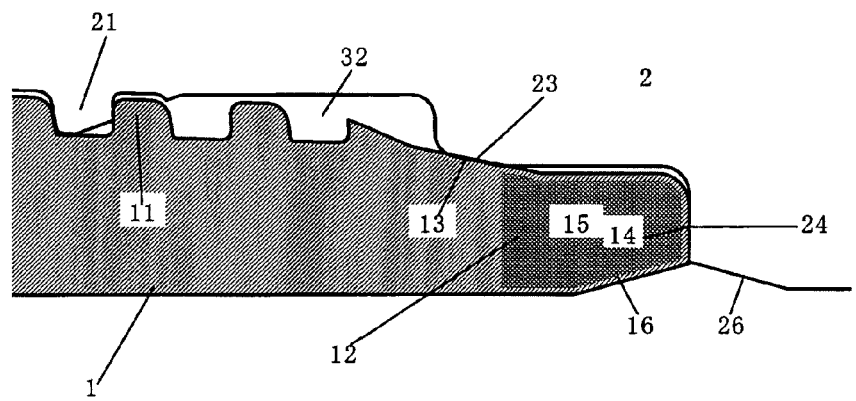
FIG. 3 is a schematic longitudinal cross-sectional view of a threaded joint for steel pipes having its lip portion elongated.

As shown in FIG. 3, a more preferred shape for the joint is one in which the length of the tip of the pin beyond the seal surface 13 of the pin 1 (namely, the distance in the axial direction of the joint between the seal surface 13 and the shoulder surface 14 at the end of the pin) is elongated, and a non-contacting region (nose portion) 15 in which the peripheral surfaces of the pin and the box do not contact each other is provided. A threaded joint for steel pipes having this non-contacting region 15 has particularly good resistance to compression, and it has excellent galling resistance at the time of makeup.

In a threaded joint for steel pipes according to the present invention, a two-step stabbing shape having a stabbing flank with a chamfer is afforded to the stabbing flanks of at least part of the threads, preferably at least the main part of the threads, and more preferably all the threads in the complete thread portion of either one member of the box or the pin (a first tubular member). In the two-step stabbing flank shape, the stabbing flank angle α is 5-45° and preferably 8-15° and the chamfer angle β thereof is 20-60° and preferably 20-40°.

Figure 2:
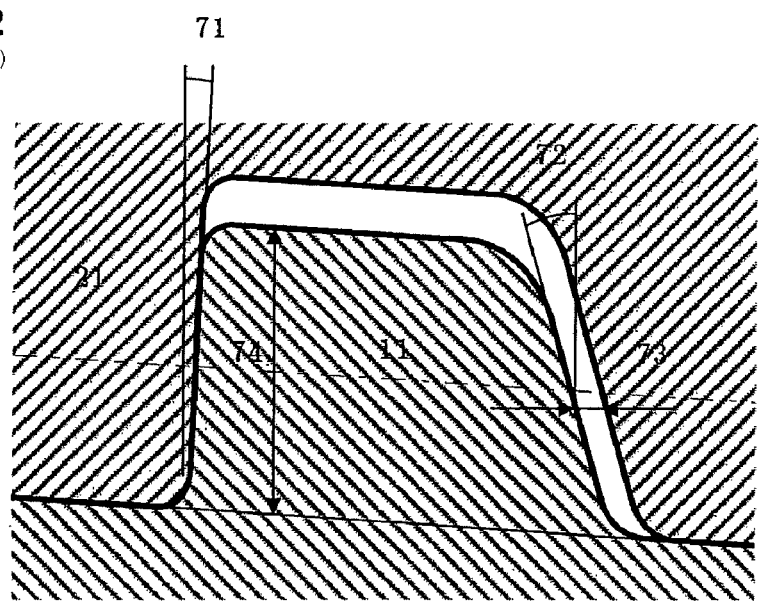
FIG. 2 is a schematic longitudinal cross-sectional view for explaining the shape and dimensions of a trapezoidal thread typified by an API buttress thread.
Figure 4:
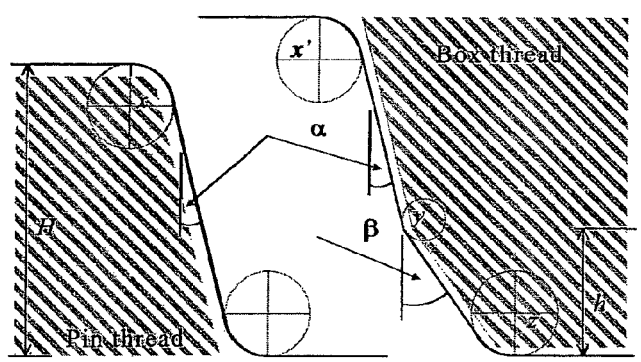
FIG. 4 is an explanatory view of the shape of the stabbing flanks of the threads of a pin and a box when the stabbing flank of the thread of the pin has a two-step stabbing shape according to the present invention.
Figure 5:
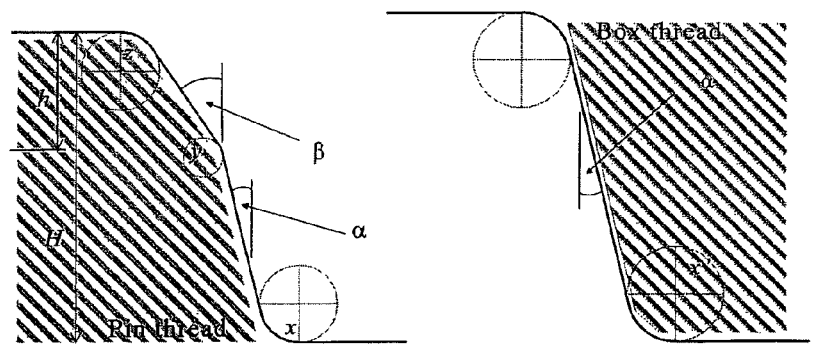
FIG. 5 is an explanatory view showing the shape of the stabbing flanks of the threads of a pin and a box when the stabbing flank of the thread of the box has a two-step stabbing shape according to the present invention.

FIG. 4 and FIG. 5 schematically show the cross-sectional shape in the axial direction of a joint of the stabbing flanks of the threads of a pin and a box for the case in which the female threads of the box have a two-step stabbing shape (FIG. 4) and for the case in which the male threads of the pin have a two-step stabbing shape (FIG. 5). As shown in these figures, the stabbing flank angle α is the angle between a stabbing flank (in the case of a two-step stabbing shape, the stabbing flank before forming a chamfer, i.e., of the two steps, the lower stabbing flank portion close to the thread root which will also be referred to below as the non-chamfered portion) and a plane perpendicular to the joint axis. The chamfer angle β is the angle between the chamfered portion of the stabbing flank (of the two steps, the upper portion of the stabbing flank closer to the thread crest) and a plane perpendicular to the joint axis. As depicted in FIG. 2, each of the stabbing flank angle and the loading flank angle of a threaded joint has the same angle between the pin and the box.

If the stabbing flank angle α of the two-step stabbing shape (corresponding to the stabbing flank angle in the complete thread portion of each of the pin and box) is less than 5°, the slope of the stabbing flanks is too small, insertion of the pin becomes difficult and it becomes easy for galling of the stabbing flanks to occur. If the chamfer angle β of the two-step stabbing shape is less than 20°, substantially no effect is obtained by the chamfer. If the stabbing flank angle α exceeds 45° and/or the chamfer angle β exceeds 60°, the slope of the stabbing flanks becomes too large, compressive loads at the time of pin insertion cannot be stably supported, the resistance of the threaded joint to compression decreases, resulting in an adverse effect on sealing properties in that it becomes easy for leaks to take place.

The shape of the chamfer of the two-step stabbing shape has an optimal range for the chamfer height h and the chamfer cross-sectional area as well as for the chamfer angle β.

The chamfer height h (the height of the chamfered portion in the direction perpendicular to the joint axis) is such that its ratio (h/H) to the thread height H of the pin is 0.25-0.50. This ratio h/H is preferably 0.3-0.4.

Regarding the cross-sectional area of the chamfer, the ratio [h'/(h'+H')] of the chamfer cross-sectional area (h') to the total cross-sectional area (h'+H') of the stabbing flank of a thread having a two-step stabbing shape is made to satisfy the following Inequality (3).

$$h' = \frac{h - z \cdot (1 - \sin\beta)}{\cos\beta} - y \cdot \sin(\beta/2 - \alpha/2) \tag{1}$$

$$H' = \frac{H - h - x}{\cos\alpha} + x \cdot \sin\alpha - y \cdot \sin(\beta/2 - \alpha/2) \tag{2}$$

$$\frac{h'}{h' + H'}(h/H = 0.25) \le \frac{h'}{h' + H'} \le \frac{h'}{h' + H'}(h/H = 0.50) \tag{3}$$

As shown in FIG. 4 and FIG. 5, the symbols in the above formulas have the following meanings:

(1) When stabbing flanks having a two-step stabbing shape are formed on the female threads of a box (FIG. 4):

α: stabbing flank angle (degrees) of the box threads, β: chamfer angle (degrees) of the stabbing flanks of the box threads, H: thread height (mm) of the pin thread, h: chamfer height (mm) of the stabbing flanks of the box threads, x: radius of curvature (mm) of the stabbing flanks at the crests of the pin threads, y: radius of curvature (mm) at the chamfer starting point of the stabbing flanks of the box threads, z: radius of curvature (mm) of the stabbing flanks at the crests of the box threads.

(2) When stabbing flanks having a two-step stabbing shape are formed on the male threads of a pin (FIG. 5):

α: stabbing flank angle (degrees) of the pin threads, β: chamfer angle (degrees) of the stabbing flanks of the pin threads, H: thread height (mm) of the pin thread, h: chamfer height (mm) of the stabbing flanks of the pin threads, x: radius of curvature (mm) of the stabbing flanks at the crests of the pin threads, y: radius of curvature (mm) at the starting point of the chamfers of the stabbing flanks of the pin threads, z: radius of curvature (mm) of the stabbing flanks at the crests of the pin threads.

In FIG. 4 and FIG. 5, x' is the radius of curvature (mm) of the stabbing flanks at the root of the box threads.

In the thread shape of either the pin or the box, the joining part between the flanks (the stabbing flanks and the loading flanks) and the thread roots and the thread crests normally have a small amount of rounding applied thereto. Above-described x, x', and z are the radii of curvature of such rounding.

As already stated, h' expressed by Equation (1) indicates the cross-sectional area of the chamfered portion of a stabbing flank, H' expressed by Equation (2) indicates the cross-sectional area of the non-chamfered portion of the stabbing flank (the portion of the stabbing flank which is not removed by a chamfer, i.e., the portion of the stabbing flank on the thread root side of a chamfer), and h'/(h'+H') in Inequality (3) indicates the ratio of the cross-sectional area of the chamfered portion to the overall cross-sectional area of the stabbing flank (chamfer cross-sectional area ratio). The chamfer cross-sectional area ratio is made at least a value corresponding to a ratio h/H of 0.25 and at most a value corresponding to a ratio h/H of 0.5. The chamfer cross-sectional area ratio is preferably made at least a value corresponding to a ratio h/H of 0.3 and at most a value corresponding to a ratio h/H of 0.4.

Namely, in the present invention, the proportion of a stabbing flank occupied by a chamfer is prescribed by either the chamfer height ratio (h/H) or the chamfer cross-sectional area ratio [h'/(h'+H')]. The chamfer height ratio (h/H) is simpler, but it does not take into consideration the effect of rounding of a stabbing flank. Therefore, the chamfer cross-sectional area ratio [h'/(h'+H')] can more accurately quantify the effect of the chamfer.

If the chamfer height ratio (h/H) or the chamfer cross-sectional area [h'/(h'+H')] is too small, there is no meaning to providing a chamfer. As a result, the degree of freedom of the pin when being inserted is low, and if the direction of insertion of the pin slightly deviates, cross-threading in which it is not possible to insert the pin easily takes place and the galling resistance of the threads decreases. On the other hand, if the chamfer height ratio or the chamfer cross-sectional area ratio is too large, the area of contact of the stabbing flanks of the pin and the box at the time of compression decreases, and the resistance to compression of the threads decreases, leading to easy occurrence of leaks in the threads. This is because the chamfered portions of the stabbing flanks, which do not contact the opposing member even under compression force applied thereto, cannot support a compressive load.

A preferred range for the radius of curvature of each portion of the stabbing flank of a thread having a two-step stabbing shape is 0.1-1.8 mm for each of x, x', y, and z.

A thread shape having a chamfer in the stabbing flanks according to the present invention is applied to the stabbing flanks of the threads in the complete thread portion of one of the pin and the box, while the stabbing flanks of the threads in the complete thread portion of the other member is not chamfered. For the incomplete threads which do not engage with the threads of the other member, it is not necessary for the stabbing flanks of the threads of either the pin or the box to have a two-step stabbing shape. However, as already proposed in above-described Patent Document 3, it is also possible to form a two-step stabbing shape on the incomplete threads. The two-step stabbing shape of the incomplete threads may be a shape according to the present invention, or it may be a shape outside the scope of the present invention.

The male threads of the pin and the female threads of the box are both tapered threads, and the pin and the box decrease in wall thickness toward their tips. As shown in FIG. 2, the crests and the roots of the male threads and the female threads may be parallel to the taper angle of the pin and the box, but they are preferably parallel to the joint axis (which is the same direction as the pipe axis), i.e., the crests and the roots preferably do not have a slope. As a result, problems due to deviation of the insertion angle at the time of makeup are decreased.

The angle of the loading flanks of the threads of the pin and the box with respect to a surface perpendicular to the joint axis (the loading flank angle) is preferably in the range from −5° to +5°. Here, when an angle of slope is negative, it means that the loading flank is sloped rearwards in the direction of pin insertion from a plane perpendicular to the joint axis.

The loading flanks of the threads of both the pin and the box do not have a chamfer. However, in order to round the corners, it is usual to round both ends of the loading flanks at the crests and the roots of the threads of the pin and the box. As shown in FIG. 2, the radii of curvature provided on the ends of the loading flanks for rounding are normally smaller than those provided on the ends of stabbing flanks which have a larger angle of slope. The radii of curvature at the ends of the loading flanks are normally at most 1.5 mm and typically at most 1 mm.

It is not necessary for all of the threads of the male threads and the female threads to threadingly engage with each other. As shown in FIG. 1(A), the length of the female threads of the box in the axial direction of the joint can be made longer than the length in the axial direction of the male threads of the pin, and the female threads in the vicinity of the tip of the box can be in a non-engaged state in which they do not threadingly engage with the male threads at the time of makeup.

As shown in FIG. 3, with the object of lengthening the male threads so that they approach as close as possible to a first seal surface adjoining the threads, a circumferential groove 32 may be provided in the box so that the male threads near the tip of the pin do not threadingly engage with the female thread in the vicinity of the first seal surface of the box. As a result, the stiffness of the lip portion is increased, leading to an increase in the resistance of the joint to compression. With the same object, the wall thickness of the pin and the box may be gradually increased towards the shoulder surfaces (the inner diameter is gradually decreased) by swaging or upsetting.

As shown in FIG. 3, it is possible to form a chamfer on both sides of the shoulder surfaces of the pin and the box. As a result, the circularity of the periphery of the coupled portions of the pin and the box on the inner surface of a pipe joint is increased, and turbulence of fluid flowing in the interior is prevented.

A threaded joint for steel pipes may have a second lip portion near the tip of the box, or a second seal surface may be provided in the vicinity of the tip of the box.

The contact surfaces of at least whichever of the pin and the box has threads with a two-step stabbing flank preferably have at least one layer of surface treatment layer selected from a plated coating, a phosphate coating, a solid lubricating coating, a semisolid lubricating coating, and a viscous liquid lubricating coating. When both the pin and the box have such a surface treatment coating, the threads having a stabbing flank with a two-step chamfered shape may be the threads of either the pin or the box. On the other hand, when a surface treatment coating is formed on only one of the pin and the box, a chamfer for imparting a two-step stabbing shape is preferably formed on the stabbing flanks of the threads of the member on which the surface treatment coating is formed.

In the case of a threaded joint for steel pipes of the coupling type, it is easier to apply surface treatment to the coupling which is shorter than the pipe, i.e., to the box. In this case, the stabbing flanks of at least part of the threads in the complete thread portion of the box are provided with the two-step stabbing shape according to the present invention.

Such a surface treatment coating generally has lubricating properties, and hence an effect on improving galling resistance. Therefore, in the case of a premium joint type threaded joint for steel pipes having threaded portions as well as seal surfaces and shoulder surfaces, a surface treatment coating is preferably formed on the entirety of the contact surfaces including the threaded portions, the seal surfaces, and the shoulder surfaces. In the case of a box, a surface treatment coating may be formed on the entire inner surface of the box.

When the surface treatment coating is a plated coating, it is preferably a coating of a metallic material having a relatively low hardness such as a Sn-based alloy (such as an alloy of Sn with at least one metal selected from Bi, In, Ni, Zn, and Cu). The plated coating may be a multi-layer plated coating having at least two layers. The coating thickness of the plated coating is preferably in the range of 1-40 μm. In order to increase the adhesion of the plated coating, flash plating of nickel or copper, for example, may be applied as a lower layer.

A phosphate coating is preferably a manganese phosphate coating or a zinc phosphate coating. A phosphate coating is a porous coating comprising entwined acicular crystals. Such a coating results in an increased retention when grease referred to as dope or a lubricating coating as described later when it is formed atop it. Accordingly, rather than forming a phosphate coating by itself, it is preferable to form it as an undercoat layer. However, if dope is applied before makeup in the field, the phosphate coating may be formed as a sole coating. The thickness of a phosphate coating is normally 3-40 μm.

A solid lubricating coating may be a baked coating comprising a lubricating powder dispersed in a binder as disclosed in JP 2001-65751 A1, JP 2002-221288 A1, JP 2002-327875 A1, and JP 2002-348587 A1, for example. A semisolid lubricating coating or a viscous liquid lubricating coating may be a coating and a base oil containing various lubricating components as disclosed in JP 2002-173692 A1 and JP 2004-53013 A1, for example.

One or more layers of these lubricating coatings may be formed. When two layers are formed, it is preferred that the lower layer be a solid lubricating coating and the upper layer be a viscous liquid lubricating coating or a semisolid lubricating coating because this arrangement produces an increased effect on improving galling resistance. When there are two layers of a lubricating coating, it is preferable for the upper layer lubricating coating to be a viscous liquid lubricating coating having high fluidity rather than a semisolid lubricating coating.

A solid lubricating coating is preferably a coating containing a lubricating powder, i.e., a lubricating coating in which particles of a lubricating powder are bonded by a suitable inorganic or organic binder.

Examples of preferred lubricating powders for use in a solid lubricating coating include, but not limited to, graphite, $MoS_2$ (molybdenum disulfide), $WS_2$ (tungsten disulfide), BN (boron nitride), PTFE (polytetrafluoroethylene), $CF_x$ (graphite fluoride), and $CaCO_3$ (calcium carbonate). Among these, graphite, graphite fluoride, $MoS_2$, and $WS_2$ are more preferred. These have a layered crystal structure in which the bonding strength within crystal planes is much higher than that between planes, resulting in easy occurrence of delamination which imparts a sliding effect, and they are suitable for increasing galling resistance.

An organic and/or inorganic film-forming substance can be used as a binder of a solid lubricating coating. Examples of an organic film-forming substance are organic resins having good heat resistance such as epoxy resins, polyimide resins, and polyamide-imide resins. An inorganic film-forming substance includes organic or inorganic compounds which can form a metal oxide coating such as silica sol, alkoxysilanes, and titanium alkoxide.

A solid lubricating coating can be formed by mixing the lubricating powder with a binder which is capable of forming a film, applying the resulting coating composition to the contact surfaces of a threaded joint for steel pipes, and preferably carrying out heating to bake the coating. The heating temperature depends upon the particular binder. In the case of an epoxy resin, a temperature of approximately 150-250° C. is preferred. A preferred solid lubricating coating has a coating thickness of 5-30 μm, and the content of lubricating powder in the coating is 10-50 mass percent.

A viscous liquid or semisolid lubricating coating preferably contains substantially no powder of heavy metals such as Pb, Zn, or Cu which are harmful to the environment and to humans. Such a lubricating coating contains a considerable amount of one or more of various lubricity-imparting components (highly basic metal salts which function as an extreme pressure agent such as highly basic Ca sulfonate, phenates, and salicylates; waxes; and metal soaps) in a base oil (such as mineral oil, high order fatty acid esters, and grease), and it becomes a viscous liquid or semisolid depending on the viscosity of the base oil and the content of solid components. It is also possible to form the lubricating coating using a commercially available green dope. A preferred thickness of a viscous liquid or semisolid lubricating coating is 10-200 μm.

A threaded joint for steel pipes according to the present invention can be used without applying dope prior to tightening operations (makeup) to thereby increase the efficiency of assembly of oil country tubular goods, particularly when at least one layer of the above-described lubricating coating is formed. However, when a lubricating coating is not formed or even when a lubricating coating is formed, dope can be applied if necessary prior to makeup. The dope which is used is preferably a type referred to as green dope which contains substantially no powder of heavy metals such as Pb which are harmful to the environment and to humans.

Example

In order to demonstrate the effects of the present invention, a chamfer was imparted to the stabbing flanks of all the threads in the complete thread portion of a box to form a two-step stabbing shape, and the stabbing flank angle α, the chamfer angle β, the chamfer height h, and the radius of curvature of each curved portion (x, y, z) were varied to produce threaded joints for steel pipes having different chamfer height ratios (h/H) and chamfer cross-sectional ratios [h'/(h'+H')]. These joints were subjected to a makeup test.

Each of the tested threaded joints was a threaded joint of the coupling type like that shown in FIG. 1 having a seal surface and a shoulder surface. The joints were for use with 9.626 inch×53.5 (lb/ft) steel pipes (outer diameter of 244.5 mm and wall thickness of 13.84 mm). The material of all the tested threaded joints was steel prescribed by API standard P110. The only torque shoulder portion was made of a shoulder surface on the end surface of the pin and a corresponding shoulder surface of the box.

The thread shape had a taper of 1/18, the height H of the male threads of the pin was 1.3 mm, the thread pitch was 5.08 mm, the flank angle of the stabbing flanks was 10°, and the flank angle of the loading flanks was −3°. The gap in the axial direction of the joint between the pin threads and the box threads in the non-chamfered portion of the stabbing flanks (stabbing flank gap) was 0.15 mm.

The contact surfaces including the threads of the box to which a two-step stabbing shape was imparted, the seal surface, and the shoulder surface (actually the entire inner surface of the box) were subjected to manganese phosphate treatment to form a surface treatment coating. The coating thickness was approximately 20 μm.

Using such a box having a thread shape including stabbing flanks with a chamfer and having a surface treatment coating formed thereon, makeup (M) and breakout (B) were repeated to investigate galling resistance. A commercial green dope was applied to the outer peripheral surface of the pin prior to makeup.

A galling resistance test was carried out by inserting a pin into the box which was sloped such that its axis was at 3° from the vertical, makeup was carried out at room temperature with a torque of 49351.8 N-m (36400 ft-lbs) until the shoulder surfaces contacted, then breakout was performed and the pin was removed, lubricant adhering to the pin was removed by washing with a solvent, and the outer peripheral surface of the pin and particularly the threads were visually observed to investigate the degree of occurrence of galling. This operation was repeated 10 times. The results of evaluation of galling resistance in terms of the number of cycles until galling (galling) occurred (the number of cycles of makeup and breakout in which galling did not take place) are shown in FIG. 6.

Figure 6:
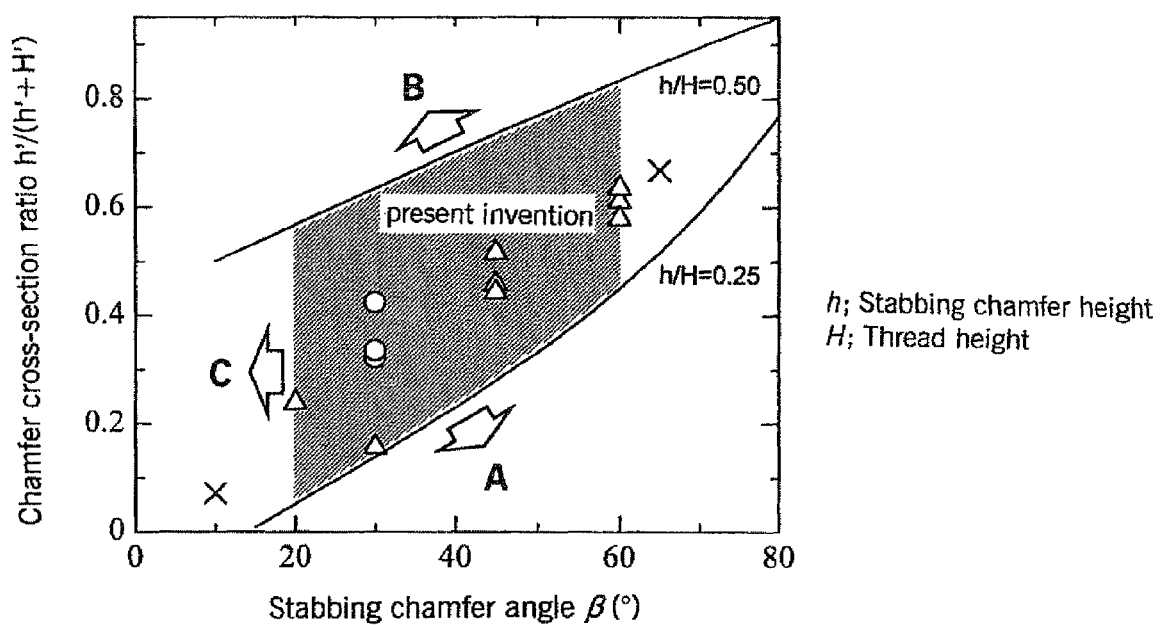
FIG. 6 is a graph showing the results of examples.

In FIG. 6, the case in which makeup and breakout were possible at least 5 times in this makeup test is shown by CIRCLE (○), the case in which makeup and breakout were possible 3 to 4 times is shown by TRIANGLE (Δ), and the case in which makeup and breakout could be performed at most 2 times is shown by X.

As can be seen from the results in FIG. 6, with a threaded joint for steel pipes having stabbing flanks with a chamfered shape (a two-step stabbing shape) which satisfies the conditions prescribed by the present invention that the chamfer angle β is in the range of 20-60° and the chamfer cross-sectional area ratio [h'/(h'+H')] is at least a value corresponding to a chamfer height ratio h/H of 0.25 and is at most a value corresponding to a chamfer height ratio of 0.50, even under the above-described conditions in which a pin is sloping with respect to the vertical and it is difficult to insert the pin, makeup and breakout were possible at least 3 times, whereas when these conditions were not satisfied, galling developed on or before two cycles of makeup and breakout. Accordingly, it can be seen that a threaded joint for steel pipes according to the present invention has excellent galling resistance.

As shown in FIG. 6, when the chamfer cross-sectional area ratio [h'/(h'+H')] is smaller than a value corresponding to a chamfer height ratio h/H of 0.25 (as indicated by arrow A), the chamfer is insufficient and the freedom of a pin and hence the ease of insertion of the pin decrease. As a result, it is frequently necessary to repeat insertion due to positional deviation (cross threading) of the pin. On the other hand, when the chamfer cross-sectional area ratio [h'/(h'+H')] is larger than a value corresponding to a chamfer height ratio h/H of 0.50 (as indicated by arrow B), although the ease of insertion of a pin is further improved, as a result of insufficient contact area of the thread stabbing flanks at the time of makeup of the threaded joint, the resistance to compression of the threaded joint decreases and leaks of fluid flowing therein develop under conditions when a high compressive force is applied.

This was confirmed by actual experiments. In addition, when the chamfer angle β is smaller than 20° (as indicated by arrow C), the ease of insertion a pin is decreased.

The same result is obtained when the test results are arranged not by chamfer cross-sectional area ratio but by the chamfer height ratio (h/H). When h/H was 0.25-0.50, it was possible to perform makeup and breakout at least 3 times.

In the above description, an example was given of a case in which the stabbing flanks of the threads of a box were given a two-step stabbing shape by a chamfer and surface treatment was afforded to the contact surfaces of a box. Conversely, it was confirmed that similar results are obtained for a threaded joint for steel pipes in which the stabbing flanks of the threads of a pin are given a two-step stabbing shape by means of a chamfer and surface treatment is afforded to the contact surfaces of the pin.

The invention claimed is:

1. A threaded joint for steel pipes comprising a pin having male threads and a box having female threads, wherein the male threads and the female threads are tapered threads having at least a complete thread portion, the threads in the complete thread portion having a roughly trapezoidal thread shape having a crest, a loading flank, and a stabbing flank with threads being separated from each other by thread roots, characterized in that at least part of the threads in the complete thread portion of either the box or the pin as a first tubular member has a two-step stabbing shape having a stabbing flank with a chamfer, said two-step stabbing shape having a stabbing flank angle α of 5-45° and a chamfer angle β of 20-60° and meeting either the following condition (1) or (2):

(1) the ratio h/H of the height h of the chamfer of the two-step stabbing shape to the thread height H of the pin is 0.25-0.50; or (2) the following inequality (3) is satisfied, $$\frac{h'}{h'+H'}(h/H=0.25) \leq \frac{h'}{h'+H'} \leq \frac{h'}{h'+H'}(h/H=0.50), \text{ wherein} \quad (3)$$

$$h' = \frac{h - z \cdot (1 - \sin\beta)}{\cos\beta} - y \cdot \sin(\beta/2 - \alpha/2),$$

$$H' = \frac{H - h - x}{\cos\alpha} + x \cdot \sin\alpha - y \cdot \sin(\beta/2 - \alpha/2), \text{ and}$$

wherein α is the stabbing flank angle (degrees) of the two-step stabbing shape, β is the chamfer angle (degrees) of the two-step stabbing shape, H is the thread height (mm) of the pin thread, h is the chamfer height (mm) of the two-step stabbing shape, x is the radius of curvature (mm) of the stabbing flanks at the thread crests of the pin, y is the radius of curvature (mm) at the starting point of the chamfer of the two-step stabbing shape, and z is the radius of curvature (mm) of the two-step stabbing shape at its thread crest.

2. A threaded joint for steel pipes as set forth in claim 1 wherein the threads of a main part in the complete thread portion of the first tubular member has the two-step stabbing shape.

3. A threaded joint for steel pipes as set forth in claim 2 wherein the pin and the box each have threads as well as a seal surface provided on a peripheral surface in the vicinity of the threads, and a shoulder surface comprising an end surface of one of the pin and the box and a surface of the other member which contacts the end surface.

4. A threaded joint for steel pipes as set forth in claim 2 wherein of the pin and the box, the contact surfaces of at least the first tubular member having the two-step stabbing shape have at least one type of surface treatment coating selected from a plated coating, a phosphate coating, a solid lubricating coating, a semisolid lubricating coating, and a viscous liquid lubricating coating.

5. A threaded joint for steel pipes as set forth in claim 1 wherein all the threads in the complete thread portion of the first tubular member has the two-step stabbing shape.

6. A threaded joint for steel pipes as set forth in claim 5 wherein the pin and the box each have threads as well as a seal surface provided on a peripheral surface in the vicinity of the threads, and a shoulder surface comprising an end surface of one of the pin and the box and a surface of the other member which contacts the end surface.

7. A threaded joint for steel pipes as set forth in claim 5 wherein of the pin and the box, the contact surfaces of at least the first tubular member having the two-step stabbing shape have at least one type of surface treatment coating selected from a plated coating, a phosphate coating, a solid lubricating coating, a semisolid lubricating coating, and a viscous liquid lubricating coating.

8. A threaded joint for steel pipes as set forth in claim 1 wherein the stabbing flank angle α is 8-15° and the chamfer angle β is 20-40°.

9. A threaded joint for steel pipes as set forth in claim 8 wherein the pin and the box each have threads as well as a seal surface provided on a peripheral surface in the vicinity of the threads, and a shoulder surface comprising an end surface of one of the pin and the box and a surface of the other member which contacts the end surface.

10. A threaded joint for steel pipes as set forth in claim 8 wherein of the pin and the box, the contact surfaces of at least the first tubular member having the two-step stabbing shape have at least one type of surface treatment coating selected from a plated coating, a phosphate coating, a solid lubricating coating, a semisolid lubricating coating, and a viscous liquid lubricating coating.

11. A threaded joint for steel pipes as set forth in claim 1 wherein the ratio h/H of the chamfer height h to the thread height H of the pin is 0.3-0.4.

12. A threaded joint for steel pipes as set forth in claim 11 wherein the pin and the box each have threads as well as a seal surface provided on a peripheral surface in the vicinity of the threads, and a shoulder surface comprising an end surface of one of the pin and the box and a surface of the other member which contacts the end surface.

13. A threaded joint for steel pipes as set forth in claim 11 wherein of the pin and the box, the contact surfaces of at least the first tubular member having the two-step stabbing shape have at least one type of surface treatment coating selected from a plated coating, a phosphate coating, a solid lubricating coating, a semisolid lubricating coating, and a viscous liquid lubricating coating.

14. A threaded joint for steel pipes as set forth in claim 1 which satisfies the following inequality (3')

$$\frac{h'}{h' + H'}(h/H = 0.3) \le \frac{h'}{h' + H'} \le \frac{h'}{h' + H'}(h/H = 0.4) \quad (3')$$

wherein each of the symbols in the formula has the same meaning as described above.

15. A threaded joint for steel pipes as set forth in claim 14 wherein the pin and the box each have threads as well as a seal surface provided on a peripheral surface in the vicinity of the threads, and a shoulder surface comprising an end surface of one of the pin and the box and a surface of the other member which contacts the end surface.

16. A threaded joint for steel pipes as set forth in claim 14 wherein of the pin and the box, the contact surfaces of at least the first tubular member having the two-step stabbing shape have at least one type of surface treatment coating selected from a plated coating, a phosphate coating, a solid lubricating coating, a semisolid lubricating coating, and a viscous liquid lubricating coating.

17. A threaded joint for steel pipes as set forth in claim 1 wherein the pin and the box each have threads as well as a seal surface provided on a peripheral surface in the vicinity of the threads, and a shoulder surface comprising an end surface of one of the pin and the box and a surface of the other member which contacts the end surface.

18. A threaded joint for steel pipes as set forth in claim 1 wherein of the pin and the box, the contact surfaces of at least the first tubular member having the two-step stabbing shape have at least one type of surface treatment coating selected from a plated coating, a phosphate coating, a solid lubricating coating, a semisolid lubricating coating, and a viscous liquid lubricating coating.

* * * * *

UNITED STATES PATENT AND TRADEMARK OFFICE
CERTIFICATE OF CORRECTION

| | | |
|---|---|---|
| PATENT NO. | : 7,900,975 B2 | Page 1 of 1 |
| APPLICATION NO. | : 12/571642 | |
| DATED | : March 8, 2011 | |
| INVENTOR(S) | : Nakamura et al. | |

It is certified that error appears in the above-identified patent and that said Letters Patent is hereby corrected as shown below:

Title Page; item (73); Vallourec Mannesmann Oil & Gas France, of Aulnoye-Aymeries (FR) should be listed as a Co-Assignee Signed and Sealed this
Second Day of October, 2012

David J. Kappos
*Director of the United States Patent and Trademark Office*